July 21, 1970  R. L. RISSER ET AL  3,521,437
MOWING DEVICE
Filed Aug. 21, 1968  2 Sheets-Sheet 1

INVENTORS
ROGER L. RISSER
ALLISON W. BLANSHINE
& HORACE G. MCCARTY
BY
ATTORNEY

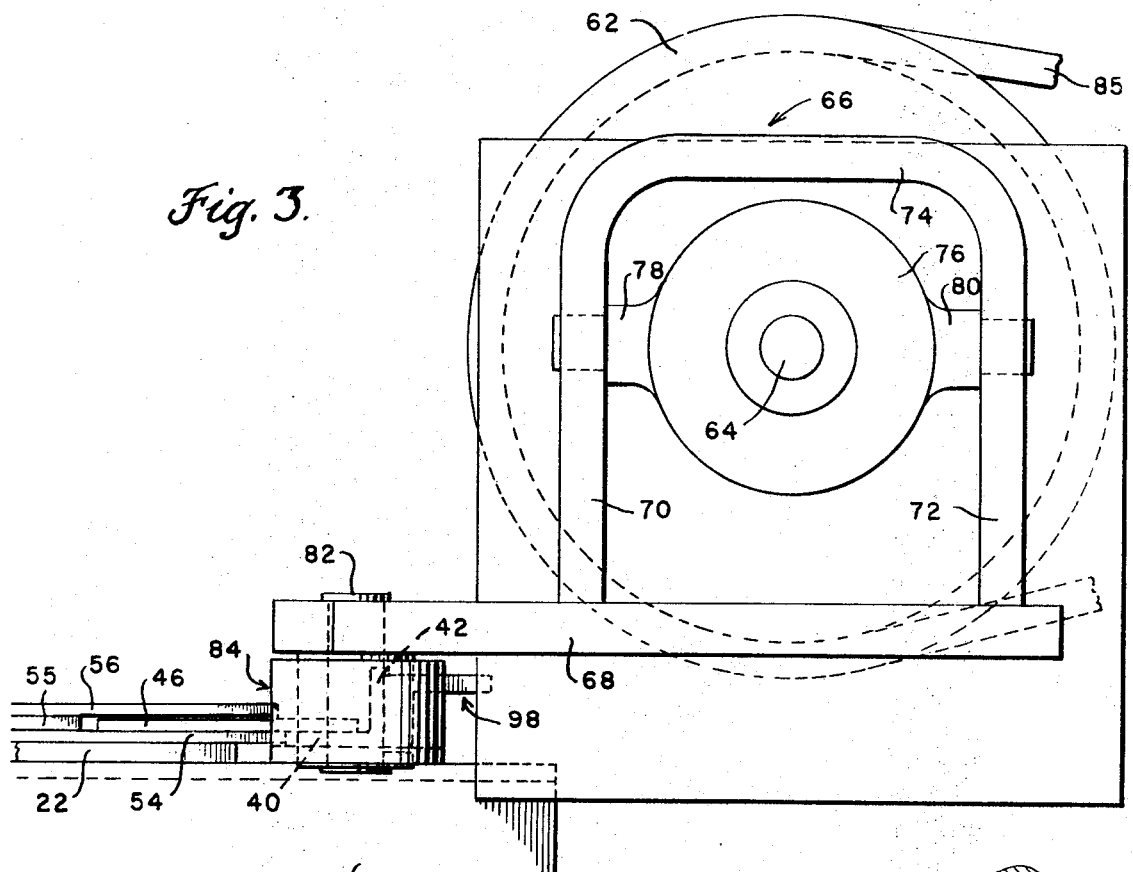
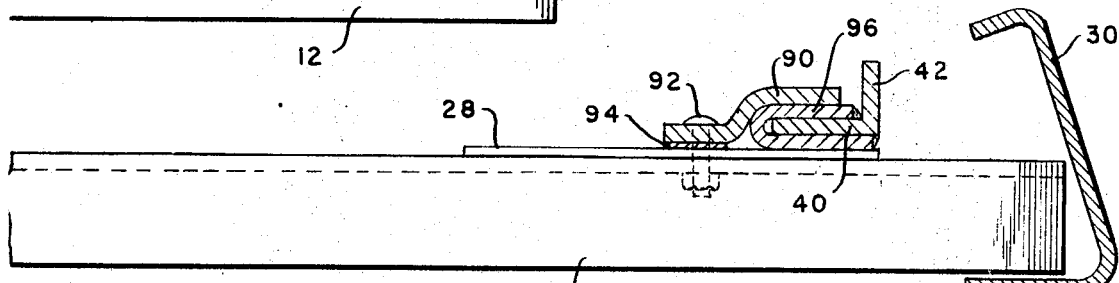
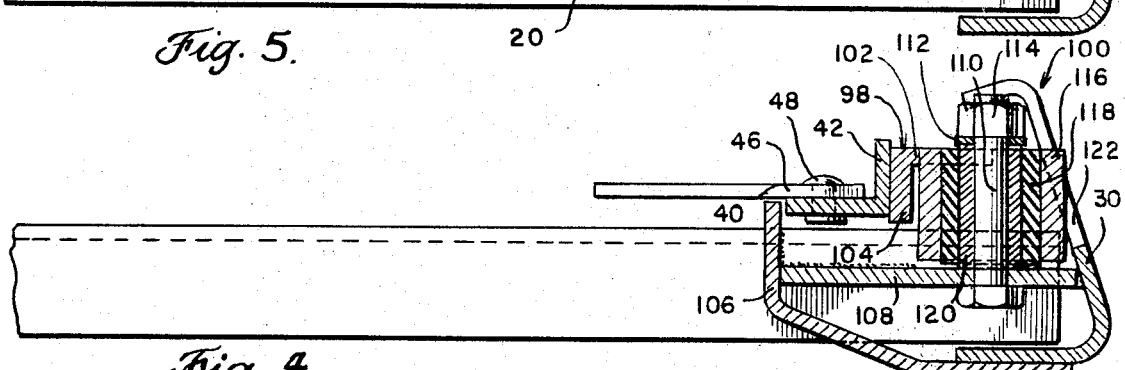
INVENTORS
ROGER L. RISSER
ALLISON W. BLANSHINE
& HORACE G. MCCARTY

3,521,437
MOWING DEVICE
Roger L. Risser, Leola, Allison W. Blanshine, Lititz, and Horace G. McCarty, Leola, Pa., assignors to Sperry Rand Corporation, New Holland, Pa., a corporation of Delaware
Filed Aug. 21, 1968, Ser. No. 754,425
Int. Cl. A01d 55/02
U.S. Cl. 56—296                                10 Claims

ABSTRACT OF THE DISCLOSURE

A mowing device having a frame, a sickle reciprocably mounted with respect to said frame, a drive mechanism disposed in close proximity at one end of the sickle for transmitting motion thereto and a resiliently, pivotally connected back-up support bar mounted behind the sickle to take up the fore-and-aft movement of the sickle resulting from the arcuate motion of the drive mechanism.

BACKGROUND OF THE INVENTION

The reciprocating sickle mounted in a mowing machine is effective to cut crop materials which are directed against it as the machine moves across a field due to the high speed of reciprocation and the mass of the sickle. Generally, the sickle bar is manufactured from a piece of flat bar stock which is securely constrained by back-up members fixed relative to the sickle and the frame. By attempting to keep the reciprocation of the sickle constrained within a plane transverse to the direction of travel of the machine, the sickle cutting action is most effective. The sickle is easily driven without great wear or noise problems. The cutting action of each knife is clean and sharp.

In most cases, however, the desirable straight line reciprocation is not achieved, because of the types of drive mechanisms available. When a wobble drive mechanism, like the one described in S.N. 442,021, now Pat. 3,444,676, for example, is used to supply motive force to the sickle, the resulting motion of the sickle is not a pure linear motion, but instead, the motion is slightly arcuate. The arcuate motion is achieved because the wobble unit is constrained so that an oscillatory motion is transferred to the drive arm. The drive arm is, in turn, fixed to the wobble unit so that its oscillatory motion describes an arc at the outer or connecting end thereof. Once the sickle is connected to the drive arms, the oscillatory motion is transferred to the sickle and because of the sickle bar constraint the resulting motion of the sickle is more or less reciprocable. The arcuate input, however, causes the sickle bar to have a fore-and-aft motion component as it reciprocates.

The combined reciprocating back and forth and fore-and-aft motion of the sickle bar causes wear on the sickle bar and the constraining members, including knife clips provided to apply a downward force on the cutting elements, which, under some conditions and in some machines, could be excessive. In general, the constraining members of previously available sickle assemblies required a time consuming and, therefore, expensive set up or adjustment of the elements prior to use to insure optimum cutting characteristics. To maintain these optimum characteristics during use prior art sickle assemblies required frequent adjustments which were time consuming and expensive for the farmer to make. Further, as the wear on the elements increases, the noise level of the operating machine becomes greater. Both wear and noise must be kept to tolerable levels.

One suggested way of overcoming this problem is to curve the sickle bar. The curved bar would compensate for the fore-and-aft movement of the sickle, but the operating characteristics of such a reciprocating sickle would be less than satisfactory and the manufacturing costs would be too high. Another way would be to mount the sickle on parallel pivoted links which would permit the required movement of the sickle bar. Again, the operational characteristics would be less than satisfactory.

SUMMARY OF THE INVENTION

Accordingly, the present invention relates generally to a reciprocating sickle mowing device adapted to overcome the problems encountered as a result of the arcuate motion transferred to the sickle by the drive mechanism, and specifically to a mowing device having a pivotally mounted back-up bar located behind the sickle which will pivot in response to fore-and-aft movement of the sickle.

By the proposed invention, a center pivoted, back-up member is mounted on a resilient bushing to permit the back-up support to oscillate with the sickle bar and to limit the fore-and-aft motion thereof through the resilient bushing. The result of such a back-up support is a longer wearing, smoother and more quiet operating sickle having a pivoted back-up that does not require any lubrication or fore-and-aft shimming during the operation thereof.

The resilient bushing is also useful to absorb shock or vibrational loads in the fore-and-aft direction which sickle is subjected to during its normal operation and to provide a spring effect through the resiliency of the bushing to keep the back-up bar up against the sickle bar.

The depending leg of the back-up bar is designed to provide a positive rearward supporting face on the upstanding leg of the sickle bar during operation thereof.

The present invention will eliminate the need for the time consuming initial set up and future frequent adjustments in the constraint elements to assure optimum cutting by the knife elements.

BRIEF DESCRIPTION OF THE DRAWINGS

FIG. 3 is an enlarged end view in the direction of the arrows 3—3 of FIG. 1.

FIG. 4 is an enlarged section view taken on the line 4—4 of FIG. 1.

FIG. 5 is an enlarged section view taken on line 5—5 of FIG. 1.

DESCRIPTION OF THE PREFERRED EMBODIMENT

Figures 1, 2:
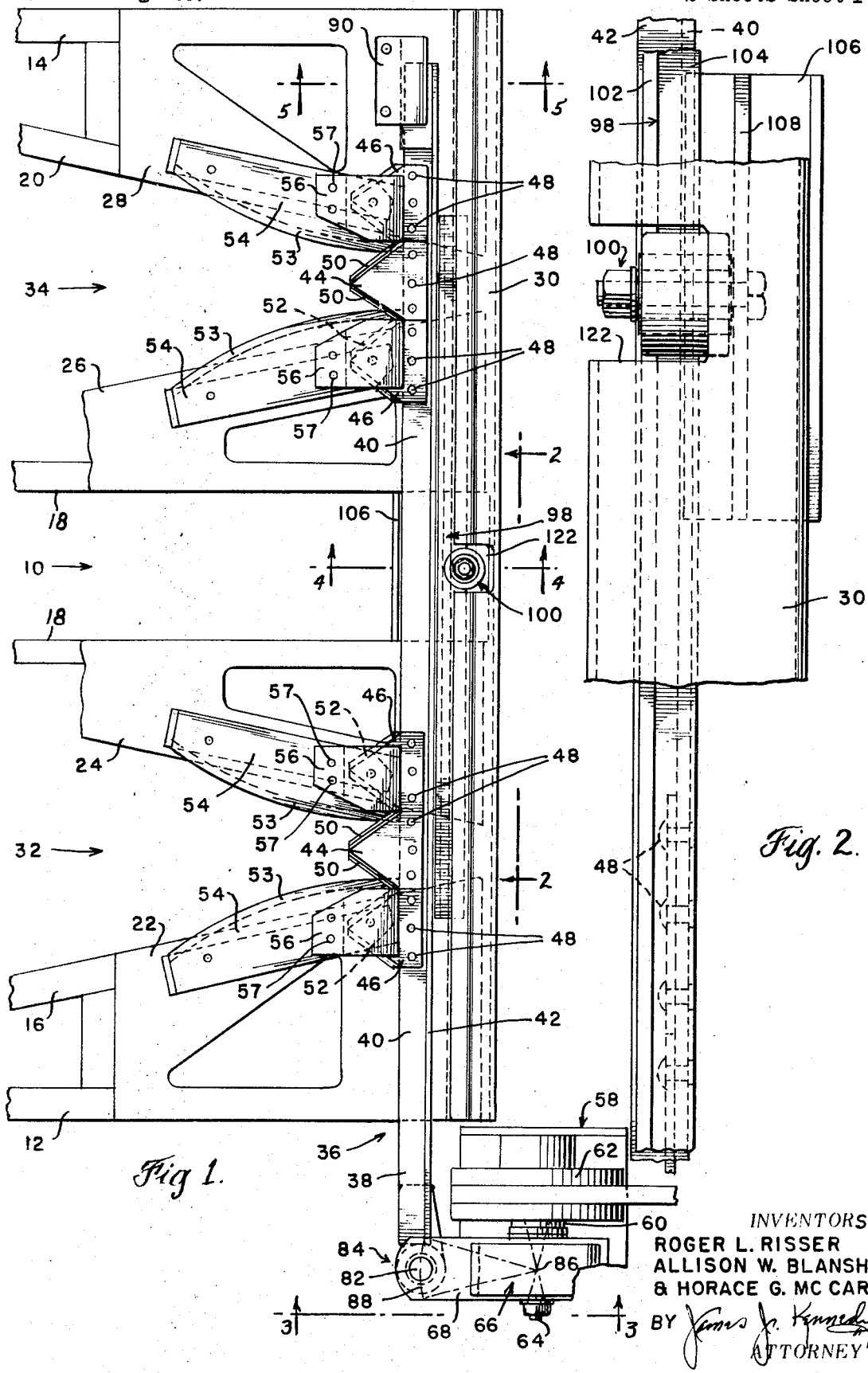
FIG. 1 is a fragmentary plan view of a row crop sickle assembly constructed in accordance with the invention.
FIG. 2 is an enlarged fragmentary view taken in the direction of the arrows along the line 2—2 of FIG. 1.

Referring now generally to the drawings, and particularly to FIGS. 1 and 2, a row crop attachment or header 10 for a harvesting machine, of the type shown in U.S. Pat. 3,352,093 to Procter, is adapted to be fixed to the forward end of a harvesting machine, or the like (not shown), for movement forwardly over the ground therewith. The header 10 has a frame structure and is comprised of a pair of side frame members 12 and 14 and a plurality of fore-and-aft extending frame members 16, 18, and 20. Plate members 22, 24, 26 and 28 extend across the fore-and-aft frame members and are fixed thereto to provide a more rigid frame structure. A rear frame member 30, a generally C-shaped channel elements, extends from side frame to side frame transverse to the fore-and-aft frame members. Crop material, such as standing corn, or the like, are fed into the machine header as it moves along the ground through the stalk passages 32 and 34 to be harvested.

Also extending transversely of the fore-and-aft frame elements but ahead of transverse frame 30 of header 10 in a generally horizontal plane is a sickle means 36. The sickle means 36 is comprised of an L-shaped sickle bar 38 having a forwardly extending leg 40 and a transversely upstanding leg 42. A plurality of knife elements 44 and 46 are spaced in groups along the sickle bar, being fixed to the forwardly extending leg thereof by a plurality of spaced rivets 48. Each knife 44 is provided with serrated edges 50 and is located between a pair of the knives 46. Each of the knives 46 is provided with blunt edges 52. Knife 44 is the primary cutting element since crop material is severed between the serrated edges 50 and edge 53 of side knives 54, which are mounted ahead of sickle bar 38 on the frame structure, but below the knives 44 and 46, as shown in FIG. 3. The knives, 46 with the blunt edges 52, move back and forth over the side knives 54 and under knife hold downs 56.

The hold downs 56 are mounted in spaced relation from the side knives 54 and knife elements 44 and 46 by spacers 55, as shown in FIG. 3. The rivets extend downwardly through hold down means 56, spacer 55, side knives 54 and into the respective cover plates. The hold downs are spaced above the cutting elements 44 and 46 so that the knives reciprocate in spaced relation beneath the hold down, but over the side knives. The edges of the side knives 54 and hold downs 56 present a suitable shearing surface for the knives 44 and 46. By this arrangement, the knives 46 serve to strip stringy crop material left on the side knives 54 and the hold downs 56 after the knife 44 has cut the crop material directed thereto. This prevents the build up of crop material at the cutting area and insures a clean, sharp cut on each stroke. The hold downs 56 also serve to effectively constrain the knives 44 and 46 as they are forced upwardly by the wedging action of the crop material being fed toward the sickle assembly during the cutting operation. The knives can only lift from the side knives to the extent provided by the space between the top of the knives 44 and 46 and the under surface of the hold downs. With this partial restraint, the chance the knives will be lifted from the side knives, decreasing the optimum cutting action, will be lessened.

One end of the sickle means 36 extends beyond the frame structure, as shown in FIG. 1, and is connected to a drive means 58. The drive means 58 is comprised of the drive shaft 60, journalled on the frame structure, a pulley 62 disposed on the drive shaft for rotation therewith, a wobble shaft 64 extending angularly outwardly from the drive shaft 60, a wobble unit 66 and a drive arm 68 connected to the wobble unit 66 for oscillation therewith. The wobble unit 66 is comprised of a yoke member, including upstanding arms 70 and 72 and a bight portion 74 connecting the legs at the upper ends thereof, and a wobble housing 76, having a pair of outwardly extending arms or trunnions 78 and 80 which are journalled in the upstanding arms 70 and 72, respectively. The drive arm 68 is secured to the lower ends of the upstanding arms 78 and 80, as shown in FIGS. 1 and 3, and extends toward the sickle bar 38. The outer end of the arm is adapted to receive a pin member 82, having a vertically extending axis, which extend through the arm and into a bushing element 84 to connect the sickle bar 38 to the drive arm.

A belt 85, driven by a suitable power source (not shown), supplies driving force to pulley 62 and drive shaft 60. As the drive shaft turns the wobble shaft 64 is also caused to turn. Since by the nature of the wobble drive unit the horizontal and vertical axis all intersect within the yoke 66, the rotary motion of the pulley input is transformed into an oscillatory motion at the drive arm 68 through the yoke structure. The point 86 (see FIG. 1) where all the axes intersect is fixed and the oscillation the drive arm takes place about that point. The path, described by the vertical axis of pin 82 traced by the line 88 shown in FIG. 1, is arcuate. The drive arm oscillates back and forth in a plane generally parallel to the ground and the arcuate motion is transmitted to the sickle means 36 through bushing 84 to effect reciprocation of the sickle. As can be seen, because the reciprocable input to the sickle is not truly a straight line reciprocating force, the sickle bar 38 will be given a slight fore-and-aft force component. This fore-and-aft motion of the sickle bar as it reciprocates causes wear and noise to build up during the machines operation.

To prevent the forward motion of the sickle bar during the operation of the machine under no load condition (without the sickle means engaging crop material), a guide means is provided at one end of sickle bar 38 which is comprised of a guide member 90 fastened to the frame by rivets or bolts 92 over a spacer 94, as illustrated in FIG. 5. During load conditions (during actual cutting of crop material) the face of the cutting action keeps the sickle bar from moving forwardly. One end of the guide member 90 is positioned closely adjacent the frame portion and spaced therefrom by the spacers 94 and 28a, while the other end of the member 90 extends substantially parallel to the frame portion and is spaced a greater distance therefrom than the first end. The sickle bar 38 is disposed behind the guide member 90 in a manner such that the forwardly extending leg portion 40 of L-shaped bar 38 is under member 90. A U-shaped wear plate 96 is wrapped around the forwardly extending portion 40 of sickle bar 38 and fixed relative thereto by welding, or the like. The wear plate 96 is adapted to fit under guide 90, as shown in FIG. 5, so that the upper and lower surfaces thereof are engageable with the under side of guide 90 and spacer 94, respectively. By this arrangement of elements, the outer end of the sickle bar is somewhat constrained and guided and kept from moving forwardly with respect to the frame portion during operation of the machine.

Mounted behind the sickle bar and in close proximity thereto is a back-up bar 98 which is pivoted intermediate the ends thereof by a pivot means 100. Bar 98 is an L-shaped member having one leg 102 extending generally parallel to the frame portion and a second leg 104 depending transversely therefrom parallel to the upstanding leg 42 of sickle bar 38 and adjacent thereto, as illustrated in FIG. 5. The pivot means 100 is connected to back-up bar 98 generally medially thereof, by the first leg 102 of the bar by welding, or the like, as illustrated in FIGS. 1 and 4. Back-up bar 98 extends behind the leg 42 of sickle bar 38 in such a manner that the ends of the bar overlap the cutting area in both directions, as shown in FIG. 1. In a three row header (not shown) the back-up bar 98 extends behind the two outside stalk passage ways overlapping the cutting areas thereof in a manner similar to that shown in FIG. 1. The pivotal bar 98 limits the travel aft by the sickle bar 38 during the reciprocation thereof.

As shown in FIG. 4, pivot 100 is comprised of an upwardly opening, generally C-shaped support frame 106 which extends between the frames elements 24 and 26 and rearward transverse frame 30 and is welded thereto, a flat support frame 108, which is fixed between frame elements 24, 26, 30 and 106, a bolt 110, a washer 112, a nut 114, an outer collar 116, a resilient bushing 118 and inner collar 120. Bolt 110 extends upwardly through plate 108, inner collar 120, washer 112 to the nut 114 which is fastened thereto. The resilient bushing 118 is bonded to the outer surface of collar 120 and the inner surface of collar or hub 116. The hub 116 and bolt 110 extend upwardly through an aperture 122 in frame 30 as shown in FIGS. 2 and 4. The inner collar 120 extends beyond hub 116 and bushing 118 in either direction and is fixed against rotation relative the back-up bar 98 and plate 108 by the clamping action of bolt 110 on washer 112 and plate 108.

In operation, the wobble unit converts rotary motion to oscillatory motion which is, in turn, transmitted to the sickle bar 38 causing it to reciprocate back and forth transversely of the frame portion of header 10. Because the motion transferred from the drive arm 68 to the sickle bar at 84 follows a slightly arcuate path, the driven end of the sickle is caused to have a fore-and-aft motion as well as a reciprocable motion. In an ordinary mowing machine the fore-and-aft motion creates wear and noise problems which are overcome by the present invention by using a pivotal back-up bar behind the sickle bar to provide a support therefore. The back-up pivots in response to the fore-and-aft motion of the driven end of the sickle relative to the frame as it reciprocates, the pivotal motion of the back-up being taken up in the twist of the resilient bushing at the pivot point. Since back-up bar 98 is fixed to hub 116, the hub is caused to twist with the bar. However, the resilient bushing is bonded to both hub 116 and collar 120 and collar 120 is fixed relative to the hub 116 and, therefore, the twist or torsion of hub 116 with respect to collar 120 is completely absorbed by the resilient bushing 118. The back-up bar physically lends rearward support to the rearward, upstanding leg 42 of the sickle bar and limits the rearward motion of the sickle bar. The pivoting feature of the bar 98 permits some rearward movement of the bar so that the sickle is not rigidly constrained. This overcomes the wear problems. The resilient bushing further limits the wear on parts because it absorbs the twist or pivoting motion of the sickle.

The bushing 118 is also effective to absorb shock loads which are imposed on the sickle and back-up bars during the normal cutting operation. In addition, the resilient bushing has a spring action to keep the back-up bar up against the rearward surface of the sickle bar.

The combination of the pivotal back-up bar with the resilient bushing, results in a smooth, quite operating sickle that is easy to set up because it does not require any fore-and-aft shimming, and the wear life of the components is greatly increased.

While the invention has been described and illustrated in its preferred embodiment, it should be understood that the invention is not to be limited to the precise details herein illustrated since the same invention may be carried out in other ways falling within the scope of the invention as claimed.

Having thus described our invention what we claim is:

1. A mowing device comprising in combination:
   a frame adapted for forward movement over the ground;
   a reciprocable sickle means extending across said frame transverse to the direction of travel thereof and supported thereby;
   a plurality of cutting blades mounted along said sickle means for cutting crop material directed thereto as said frame moves across the ground;
   drive means on said frame at one side thereof for changing a rotary motion input into an oscillatory motion output and transferring said output motion to said sickle means to effect reciprocation thereof, the path of travel described at the output of said drive means being arcuate;
   means connecting said drive means to one end of said sickle means for transferring said arcuate motion output to said sickle means, said arcuate motion input to said sickle means establishing a component of lateral reciprocable movement and a component of fore-and-aft movement in said sickle bar;
   back-up means disposed behind said sickle means and pivotal with respect thereto for limiting the rearward motion of said sickle means; and
   resilient pivotal connecting means for connecting said back-up bar to said frame and for cooperating with said back-up bar to limit rearward motion of the sickle means.

2. A mowing device as recited in claim 1 wherein, said back-up means is comprised of an L-shaped member extending behind said sickle means adjacent thereto.

3. A mowing device as recited in claim 2 wherein, said L-shaped back-up member has a forwardly extending horizontal leg and a transverse downwardly extending leg, said forwardly extending leg being in engagement with said pivotal connecting means and said transverse downwardly extending being engageable with said sickle means.

4. A mowing device as recited in claim 1 wherein, said pivotal connecting means is comprised of a support on said frame, a resilient bushing, and means connecting said bushing to said support.

5. A mowing device as recited in claim 4 wherein, said resilient bushing is comprised of an outer hub engageable with said back-up means, an inner collar surrounding said means connecting said bushing to said support and a resilient member between said outer hub and inner collar, said resilient member being bonded to both said hub and said collar and said collar being fixed against rotation relative to said hub whereby as said back-up pivots in response to movement of said sickle means, the pivotal motion is taken up by the twisting of said resilient member.

6. A mowing device comprising, in combination:
   a frame adapted for forward movement over the ground;
   a reciprocable sickle bar extending across said frame transverse to the direction of travel thereof and supported thereby, said bar comprising an L-shaped member having a forwardly extending leg and an upwardly extending leg transverse to said forwardly extending leg;
   a plurality of cutting blades mounted along said sickle bar for cutting crop material directed thereto as said frame moves across the ground, said blades being connected to said forwardly extending leg of said sickle bar;
   drive means on said frame at one side thereof for changing a rotary motion input into an oscillatory motion output and transferring said output motion to said sickle bar to effect reciprocation thereof, the path of travel described at the output of said drive means being arcuate;
   means connecting said drive means to one end of said sickle bar for transferring said arcuate motion output to said sickle means, said arcuate motion input to said sickle means establishing a component of lateral reciprocable movement and a component of fore-and-aft movement in said sickle bar;
   means on said frame adjacent one end of said sickle bar for guiding the reciprocation of the sickle bar and limiting the forward motion thereof;
   back-up means disposed behind said sickle bar and pivotal with respect thereto for limiting the rearward movement of the sickle bar; and
   resilient pivotal connecting means for connecting said back-up means to said frame whereby fore-and-aft movement of said sickle bar resulting from the arcuate motion of said driving connection to the sickle bar is limited by the back-up means and the pivotal connecting means.

7. A mowing device as recited in claim 6 wherein, said back-up means extends along said sickle bar adjacent the upwardly extending leg beyond said knife blades in each direction.

8. A mowing device as recited in claim 6 wherein, said back-up means is comprised of an L-shaped member having a first leg extending toward said sickle bar and a second leg extending transversely downward from said first leg parallel and adjacent to said upwardly extending leg of said sickle bar.

9. A mowing device as recited in claim 6 wherein, said back-up means is medially pivotally connected to said frame.

10. A mowing device as recited in claim 6 wherein, said means pivotally connecting said back-up means to said frame includes a resilient bushing adapted to take up pivotal movement transmitted to said back-up means by said reciprocating sickle.

References Cited

UNITED STATES PATENTS

| | | | |
|---|---|---|---|
| 2,691,863 | 10/1954 | Krause | 56—296 |
| 2,824,416 | 2/1958 | Orelind | 56—296 |
| 2,850,864 | 9/1958 | Rohweder | 56—296 |
| 3,213,597 | 10/1965 | Procter | 56—16 |
| 3,300,953 | 1/1967 | Glass | 56—23 |

RUSSELL R. KINSEY, Primary Examiner

U.S. Cl. X.R.

56—16